(No Model.)

J. I. PERKINS.
MACHINE FOR PULLING STUMPS.

No. 442,329. Patented Dec. 9, 1890.

Witnesses:
Geo. E. Trech.
W. J. Duvall.

Inventor
Jesse I. Perkins.
By his Attorneys,
C. A. Snow & Co.

UNITED STATES PATENT OFFICE.

JESSE ISAAC PERKINS, OF GROVE, TEXAS.

MACHINE FOR PULLING STUMPS.

SPECIFICATION forming part of Letters Patent No. 442,329, dated December 9, 1890.

Application filed July 6, 1889. Serial No. 316,728. (No model.)

*To all whom it may concern:*

Be it known that I, JESSE ISAAC PERKINS, a citizen of the United States, residing at Grove, in the county of Lamar, in the State of Texas, have invented a new and useful Machine for the Purpose of Pulling Stumps, of which the following is a specification.

This invention has relation to stump-pullers; and the objects and advantages of the invention, together with the novel features, will appear in the following description.

Figure 1:
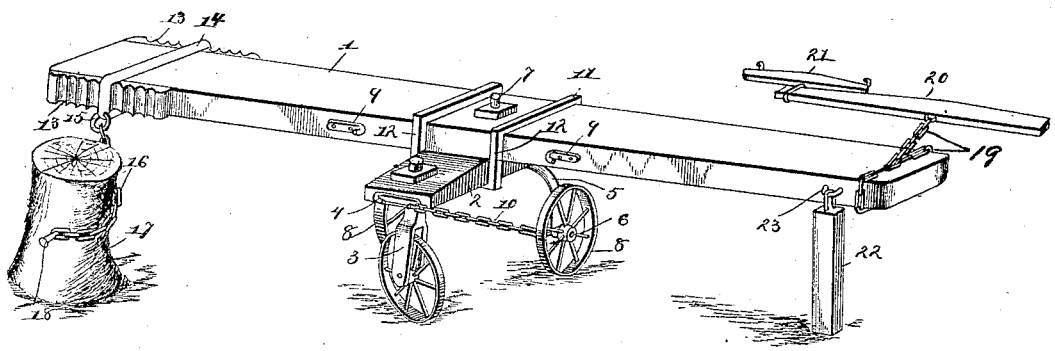
Figure 2:
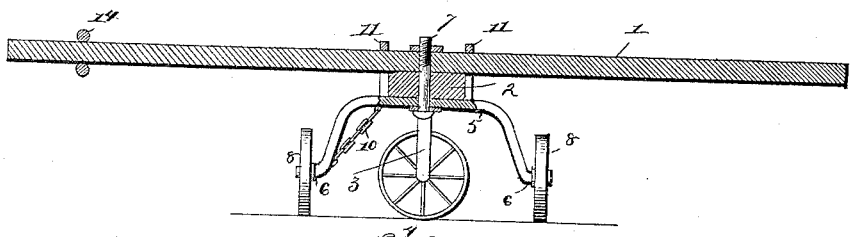
Figure 5:
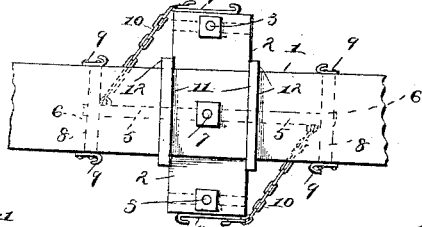
Figure 3:
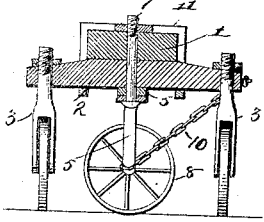
Figure 4:
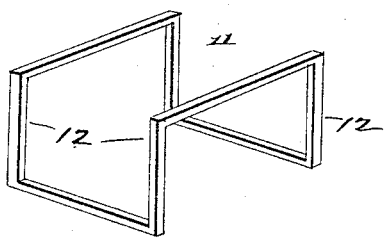

Referring to the drawings, Figure 1 is a perspective of a stump-puller constructed in accordance with my invention, the same being shown in operative position. Fig. 2 is a vertical longitudinal section. Fig. 3 is a transverse section. Fig. 4 is a detail in perspective of the bail. Fig. 5 is a plan view of a portion of the machine, illustrating the position of the truck when the machine is being operated.

Like numerals of reference indicate like parts in all the figures of the drawings.

1 designates the beam or lever, which is of suitable dimensions and is balanced at its center upon a proper truck. The truck consists of an stationary crosstree 2, arranged at a right angle to and under the center of the beam or lever 1. In the outer ends of said crosstree are swiveled casters 3, which rest upon the ground and aid in supporting the lever or beam 1. The outer ends of the crosstree 2 are also provided with double hooks 4.

5 designates the second crosstree or axle of the beam-supporting truck, and the same is of inverted-U shape, or, in other words, is curved between its bearings 6, and at its center receives the king-bolt 7, which also passes through the beam or lever and the crosstree 2 and is properly nutted or secured in position. The outer ends or bearings of the axle 5 are provided with ground-wheels 8, which coact with the swiveled caster-wheels 3 in supporting the beam or lever.

Upon each side of the beam or lever and in front and behind the crosstree 2 are located inwardly-disposed hooks 9, which are designed to engage the outer ends of short chains 10, each of which is secured to a bearing end of the axle 5, whereby said axle, when swung or turned parallel to the crosstree 2, may be rigidly held parallel to said crosstree, and thus the machine hauled about a field or from point to point. When in operation, however, the truck acts as a pivot for and turns with the beam, and it is therefore desirable to secure the curved axle at a right angle to the crosstree 2 and parallel with the lever. In such instances the free ends of the short chains are disconnected from the hooks 9 and connected to the hooks 4 on the ends of the crosstree 2, so that the truck forms a pivotal support, the caster-wheels 3 readily following in the course of the wheels 8.

11 designates a metal bail provided with opposite depending ends 12, which take under the crosstree 2 at opposite sides of the lever 1, and thus aid in rigidly securing said crosstree to the lever.

The rear sides of the lever 1 are provided with opposite corrugated-metal plates 13, which are embraced by a rectangular bail or frame 14, which is adjustable in different corrugations and is designed to bind the same in position. The bail is provided with a ring 15, to which is connected one end of a chain 16, the opposite end of said chain being secured to the stump 17 by means of a spike 18 or otherwise.

19 designates a draft-chain secured to the front end of the beam or lever 1, and to the free end of the chain is connected a doubletree 20 carrying singletrees 21.

22 designates a leg for supporting the front end of the beam or lever, said leg being loosely connected by eyes 23 to said beam or lever, whereby it may be thrown into or out of operative position.

The operation of the invention will be readily understood, in that it is simply necessary to start the team, the parts being in the position shown in Fig. 1, when the end of the lever coming in contact with the stump the latter forms a fulcrum for the former, the chain is strained, and the tree torn from the ground.

Having described my invention, what I claim is—

1. In a stump-puller, the combination, with the beam or lever, of the rigid crosstree or axle 2, provided at its ends with wheels and arranged under the lever or beam, the oppositely-disposed crosstree 5, arranged under the crosstree 2, the chains 10, connected to the crosstree 5 at each side of its pivot, hooks located upon the sides of the lever and the end of the crosstree 2 and adapted to engage the free ends of the chains, and a pivot-bolt passing through the axle 5, substantially as specified.

2. In a stump-puller, the combination, with the main beam, of the rigid crosstree arranged transversely of the same and provided at its ends with loose casters, and a pivoted axle or tree terminating in axle-bearings and provided with wheels, and means for adjusting the pivoted crosstree with relation to the beam and rigid crosstree, substantially as specified.

3. In a stump-puller, the combination, with the main beam, of the tree or axle 2, terminating in bearings, the loosely-swiveled casters mounted in bearings, the pivoted axle 5, terminating in bearings, the wheels mounted on the bearings, means for adjusting the axle, and the bail 11, having the opposite depending ends or stirrups 12, said bail straddling the lever 1, depending at each side of the same and receiving the ends of the crosstree 2, substantially as specified.

JESSE ISAAC PERKINS.

Witnesses:
WM. EUBANK,
HIX COOK.